(12) United States Patent
Damkjaer

(10) Patent No.: US 6,412,625 B2
(45) Date of Patent: Jul. 2, 2002

(54) FEED APPARATUS

(75) Inventor: Poul Erik Damkjaer, Vejle (DK)

(73) Assignee: Uni-Chains A/S, Vejle (DK)

( * ) Notice: Subject to any disclaimer, the term of this patent is extended or adjusted under 35 U.S.C. 154(b) by 0 days.

(21) Appl. No.: 09/975,249

(22) Filed: Oct. 12, 2001

Related U.S. Application Data

(63) Continuation of application No. 09/567,760, filed on May 9, 2000.

(51) Int. Cl.[7] .............................................. B65G 23/06
(52) U.S. Cl. ....................................... 198/834; 198/853
(58) Field of Search .................................. 198/834, 853

(56) References Cited

U.S. PATENT DOCUMENTS

| | | | | |
|---|---|---|---|---|
| 3,724,285 A | | 4/1973 | Lapeyre .................. 73/243 FC |
| 4,051,949 A | | 10/1977 | Lapeyre ..................... 198/853 |
| 4,171,045 A | | 10/1979 | Lapeyre ..................... 198/853 |
| 4,925,016 A | * | 5/1990 | Lapeyre ..................... 198/834 |
| 5,040,670 A | | 8/1991 | Mendoza .................... 198/853 |
| 5,213,203 A | | 5/1993 | Kinney et al. .............. 198/850 |
| 5,586,643 A | * | 12/1996 | Zabron et al. ............... 198/853 |
| 5,613,597 A | * | 3/1997 | Palmaer et al. ............. 198/853 |
| 5,706,934 A | * | 1/1998 | Palmaer et al. ............. 198/853 |
| 5,791,455 A | * | 8/1998 | Clopton ................... 198/834 X |
| 6,148,990 A | * | 11/2000 | Lapeyre et al. ......... 198/853 X |

FOREIGN PATENT DOCUMENTS

| | | |
|---|---|---|
| GB | 2127373 | 9/1983 |

* cited by examiner

*Primary Examiner*—Joseph D. Pape
*Assistant Examiner*—Lori L Coletta
(74) *Attorney, Agent, or Firm*—Antonelli, Terry, Stout & Kraus, LLP

(57) ABSTRACT

A feed apparatus (1) comprising a conveyor belt (2), the conveyor belt (2) comprising modules (3) with an upper (4) and a lower (5) surface, the modules (3) comprising hinge eyes (7) pivotally hinged to each other perpendicular to the feed direction. The feed apparatus (1) comprises at least one rotatable and toothed driving wheel (8) meshed with the conveyor belt (2), with the pressure receiving surface (10) of the teeth wholly or partially in contact against at least the outer surface (13) of its own hinge eye (7). Therefore an optimum force transmission to the belt itself is achieved, which occurs through the teeth of the sprocket wheel applying driving force at the hinge eyes, thus making the force transmission occur close to the center line of the axis of the hinge eyes. There is a good lateral steering of the belt, so that the risk that the belt hops off the toothed wheel is minimized.

28 Claims, 2 Drawing Sheets

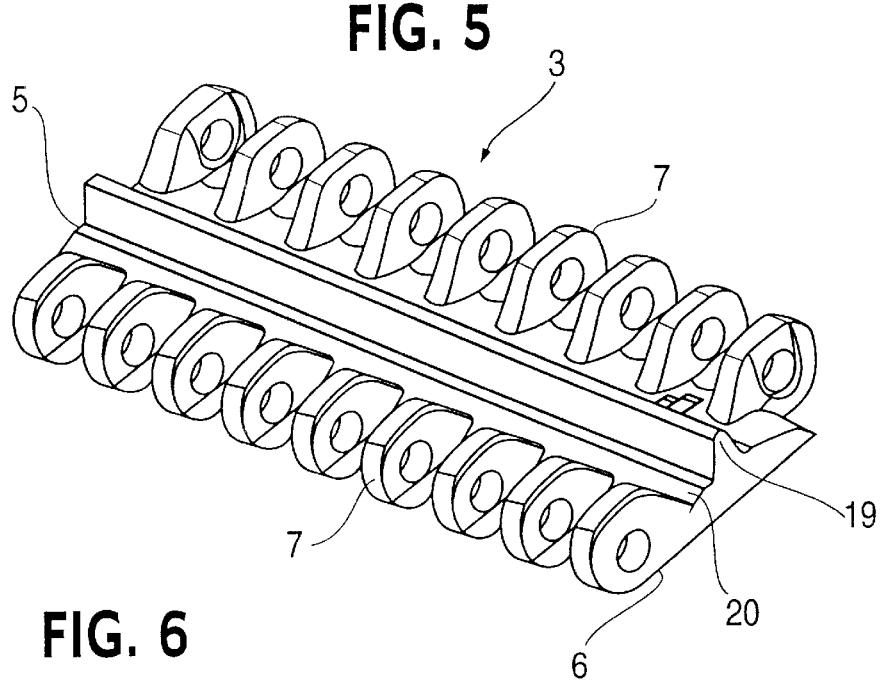
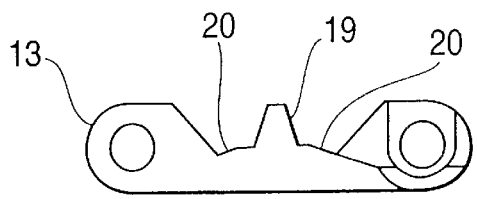
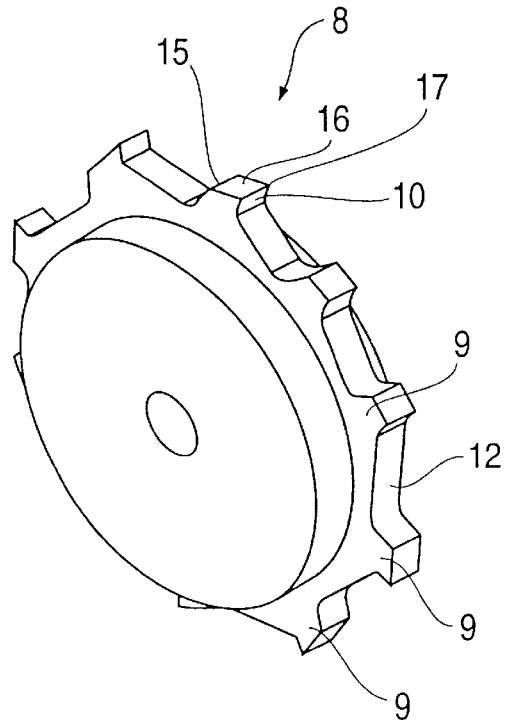

FEED APPARATUS

CROSS REFERENCE TO RELATED APPLICATION

This application is a continuation of Ser. No. 09/567,760 filed May 9, 2000 which application is incorporated herein by reference in its entirety.

BACKGROUND OF THE INVENTION

1. Field of the Invention

The invention concerns a feed apparatus comprising a conveyor belt, the conveyor belt comprising modules with an upper and a lower surface, the modules having hinge eyes pivotally hinged to each other perpendicular to a feed direction, and at least one rotatable and toothed driving wheel meshed with the conveyor belt.

2. Description of the Prior Art

EP 0 380 203 discloses a feed apparatus comprising a toothed wheel and a belt, and where the toothed wheel drives the belt forward by means of recesses which grip into a transverse rib on the undermost surface of the belt. The sprocket wheel thus exerts a force on the diagonal surface of which the side of the middle rib is formed, so that as soon as there is a strain on the belt an upward-pressing of the belt up over the tooth will take place. The risk that the belt hops totally off the toothed wheel is significantly great. There is thus a relatively poor engagement between belt and sprocket wheel.

Besides, there is no lateral guiding of the belt, which is sufficiently expedient in that a rib placed between the teeth serves as a lateral guide, so that the belt does not become displaced sideways, but the function of the rib itself causes meat remains and the like to become embedded between the teeth. The only possible method of cleaning the belt is through use of a high pressure cleaner, which is very difficult.

Finally, the belt lays flat when running back, thus not enabling fluid to be automatically drained, since the lower surface of the belt is totally flat.

The present invention provides a feed apparatus which is not encumbered with the disadvantages of the known system, and where it is possible to achieve an optimum force transmission to the belt itself, which will occur by the teeth of the sprocket wheel achieving origin of force at the hinge eyes, thus enabling the force transmission to materialize close to the center line of the axis of the hinge eyes, in the same way enabling a favorable lateral steering of the belt, so that the risk that the belt hops off the toothed wheel is minimized.

This object is achieved with a feed apparatus where the pressure receiving surface of the teeth wholly or partially has contact against at least the outer surface of its own hinge.

The feed apparatus works by the toothed wheels gripping inward in the outer surface of the modules, in that the teeth are formed in such a manner which enables their pressure receiving surface, that is the surface which under rotation of the toothed wheel presses against the belt, to press against the surface of the hinge eyes, and thus a force transmission takes place directly to the belt. The belt can withstand considerable stresses, all the way up to 2500 Newtons, whereas the known belt systems only allow stress influences of 1200–1300 Newtons.

Since the teeth are engaged against the hinge eyes, the pressure on the belt will in all cases remain approximately unchanged, so that the belt will not hop off, since there is not a force-arm relationship which would otherwise be in effect in the case of known systems.

By providing a feed apparatus according to the invention, there is sufficient room for the teeth of the toothed wheel between the hinge eyes, and since there is room for the teeth between the hinges because of the diagonal surfaces, a favorable pressure surface for the sprocket wheel is achieved, which simultaneously sideway-steers the belt.

The pressure receiving surface against the hinge eyes is practically perpendicular, so that there is no pressure on the belt in the perpendicular direction, but only forward. Therefore, it is avoided that the belt passes over the teeth upon application of stress, so that the belt hops off.

An optimization of the interaction between the toothed wheel and hinge eyes is achieved, so that the force transmission from the toothed wheel occurs close to the center line of the axis of the hinge eyes.

Room for a rib on the undermost surface of the belt is achieved, the rib extending along the center line of the module and parallel with the lengthwise sides which facilitates drainage of liquid from a lower surface of the modules and further strengthens the belt.

An optimum sideways-steering is achieved, using a loose fit of the toothed wheel in the space between the hinge eyes, though not large enough so that a twisting of the toothed wheel or the belt will be displaced from a position between the two hinge eyes.

BRIEF DESCRIPTION OF THE DRAWINGS

The invention will now be explained in more detail with reference to the drawing, where FIG. 4 shows a perspective drawing of the toothed wheel, FIG. 5 shows the module seen from the undermost surface, and FIG. 6 shows the module shown in FIG. 5 seen from one of the end surfaces.

DESCRIPTION OF THE PREFERRED EMBODIMENTS OF THE INVENTION

Figure 1:
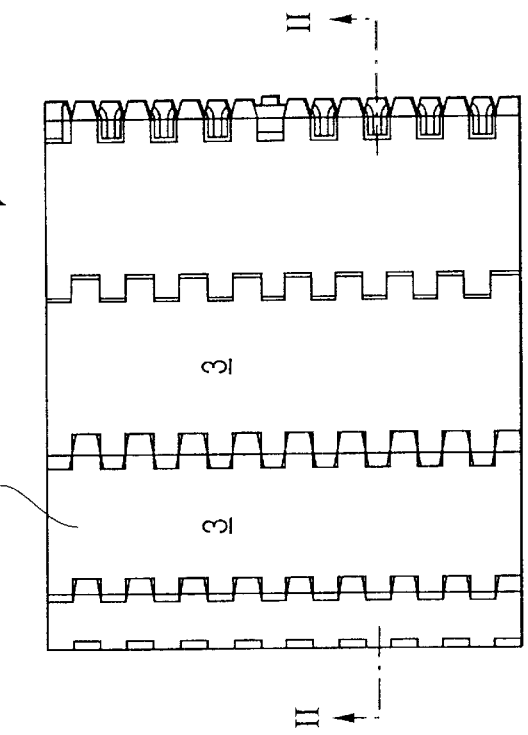
FIG. 1 shows a conveyor belt seen from above, where it is fed around a toothed wheel.

FIG. 1 shows a feed apparatus seen from above, where a cross-section of the conveyor belt 2 is seen, which is composed of rectangular modules 3, which on the length sides are pivotally hinged to each other by hinge eyes 7, so that a hinge eye on the one length side of one of the rectangular modules is surrounded by two corresponding hinge eyes on the adjoining module, the hinge eyes in this way being connected by a parallel positioned pin/axle 21 in the axis, around which the two modules can revolve. The hinge eyes 7 are alternately related to the first and the second modules along the radial axis.

Figure 2:
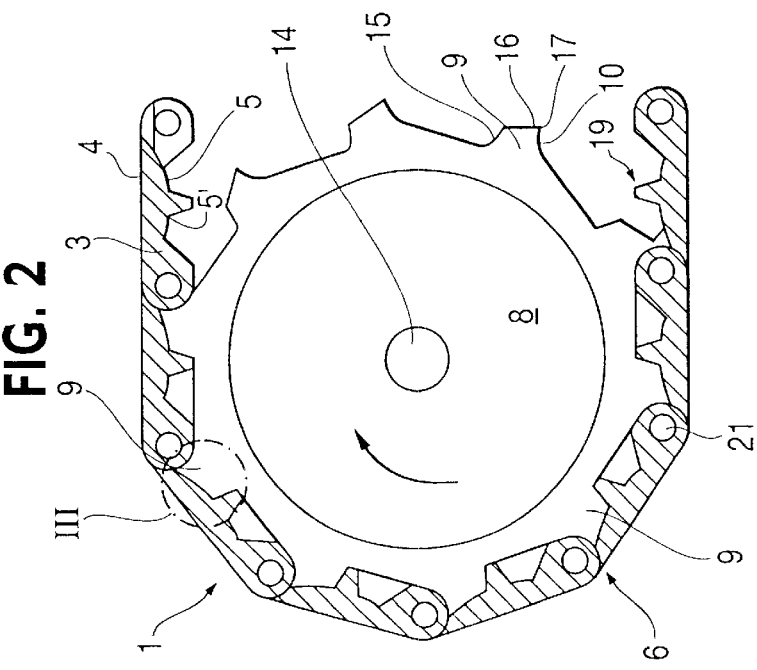
FIG. 2 shows the conveyor belt seen from the side, along the line II—II in FIG. 1, and where the mutual relations of the belt and the toothed wheel are shown.

FIG. 2 shows a cross section along the line II—II in FIG. 1, and where the feed apparatus 1 is seen from the side, the feed apparatus comprising the mentioned conveyor belt 2 as well as a driving wheel 8, the driving wheel 8 comprising teeth 9 in the periphery, the teeth all being identical and positioned with the same distance between them. The bottom surface 5 slants away from the base 5' of the rib 19 and toward the top surface 4. The teeth 9 grip at the undermost surface of the conveyor belt 2, in that the pressure receiving surface 10 of the driving wheel 8, in other words the surface which transfers a force to the conveyor belt during rotation of the driving wheel 8, has direct contact with the outer surface of the hinge eyes, as will be explained further in the following.

Figure 3:
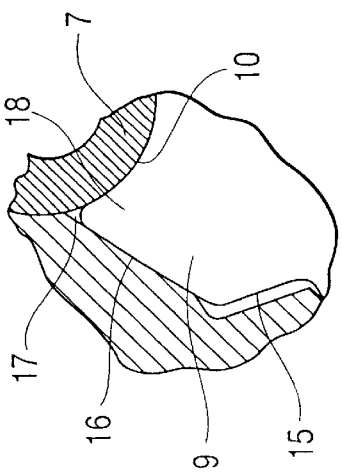
FIG. 3 shows a detailed drawing from FIG. 2.

The modules can, as previously mentioned, be rotated around each other by means of pins/axles 21, and thus connect the separate modules 3 with each other. As shown in FIG. 3 in detail, the teeth 9 include a pressure receiving surface 10, which is substantially congruent in form with the outer peripheral surface of the hinge eyes 7, that it contacts during driving of the conveyor belt 2, and whereby it is ensured that the force is transmitted close to the center line of the pins.

The pressure receiving surface is thus a concave area with respect to the rotational direction of the driving wheel, and where the concavity has the same radius of curvature as the radius of curvature of the hinge eyes 7. In a certain area, the pressure receiving surface 10 will assume an angle from the toothed wheel of 0–10°. The pressure receiving surface 10 evolves outward in a demarcation edge 17, which is demarcated in such a manner that the pressure receiving surface 10 on the one side and a demarcation surface 16 form an acute angle.

The demarcation surface 16 is plane and continuitively parallel with the outermost surface of the conveyor belt 2, so that when the tooth is engaged with the hinge, the demarcation surface 16 rests in a plane corresponding to the outermost side of the conveyor belt 2, which is why the conveyor belt expediently has a form, which will be explained in detail with reference to FIG. 6.

The demarcation surface 16 proceeds thereafter in a surface 15 positioned opposite the pressure receiving surface 10, and the surface of which is now being called the second surface of the tooth, where this second surface of this tooth and the demarcation surface 16 form an obtuse angle, where they meet. All teeth are identical, and between the teeth the surface 12 is plane and extending linearly, so that the greatest distance from the surface is closest to the pressure receiving surface 10, and the shortest distance is at the second surface 15.

The undermost surface of the modules is depicted in FIGS. 5 and 6. FIG. 5 shows a module seen from the undermost surface comprising one with the longitudinal parallel progressing ribs 19, the ribs 19 being positioned along the middle axis of the module. The rib is formed in such a manner that its walls converge away from the lower surface 5 of the module. The lower surface 5 of the outermost surface of the module is slanted, so that the outermost surface is formed mirror-inverted around the rib, and where this surface slopes and thus causing a decreasing thickness of the module away from the rib. With this construction a surface is achieved, which is congruent with the demarcation surface 16 of the driving wheel 8, whereby a suitable transmission of pressure is achieved during stress influence of the belt during operation.

The form of the hinge eyes is clearly depicted in FIG. 5 and is substantially identical with the modules, which are known from EP 0 380 203. As an additional aid toward stability of the meshing of the driving wheel in the modules is that the teeth 9 have their demarcation edge 17 and parts of the demarcation surface 16 situated between two parallel placed module eyes 7, and have a width corresponding to 80–90% of this, so that the wheel can be positioned approximately between the modules and remain standing without any risk of falling. In this way, a very good lateral stability of the belt is achieved.

FIG. 6 shows the module as shown in FIG. 5 seen from one of the sides and thus comprises hinge eyes, which have a radius of curvature 13, which substantially corresponds to the radius of curvature, which the pressure receiving surface 10 has, and as shown in FIG. 3.

FIG. 4 shows a picture in perspective of the driving wheel 8 according to the invention, where the substantial detail is the mentioned teeth, which all are identical, and that these teeth as a result of their form are able to mesh in the center line of the proximity of the hinge eyes, i.e. close to the pin/axle to the center line of the modules 21, whereby the transmission of force is optimized.

Finally, the slanted surface on the undermost surface of the modules causes fluid to be automatically drained away because of the slanted surface. The slanted surface also allows room for the teeth of the sprocket wheel between the hinge eyes, which are used as pressure receiving surface for the sprocket wheel and at the same time laterally steer the belt. The teeth of the sprocket wheel are formed in a such a manner that the pressure receiving surface toward the hinge eyes is approximately perpendicular. This means that only a forward directed pressure and not a perpendicular pressure on the belt is inflicted. In this way, the belt coming over the teeth is avoided. Furthermore, the uppermost and lowermost surfaces of the belt are similar to the known belts, whereby it therefore is the undermost side as well as the sprocket wheel itself that are unique in the invention.

What is claimed is:

1. A feed apparatus comprising a conveyor belt, the conveyor belt comprising modules with an upper and a lower surface, the modules comprising hinge eyes pivotally hinged to each other, a rib including a base intersecting the lower surface at two locations, the rib projecting longitudinally along each module and away from the lower surface of each module, and a driving wheel which drives the conveyor belt; and wherein the lower surface has slanting portions extending respectively away from each location for draining liquid away from the base of the rib toward the hinge eyes.

2. A feed apparatus in accordance with claim 1 wherein:

the driving wheel is a toothed driving wheel with teeth of the driving wheel meshing with a surface projecting from the lower surface.

3. A feed apparatus in accordance with claim 2 wherein:

the teeth mesh with the hinge eyes.

4. A feed apparatus in accordance with claim 1 wherein:

the rib has two downwardly projecting surfaces which extend from the base and intersect a surface connecting the two downwardly projecting surfaces which is below the lower surface.

5. A feed apparatus in accordance with claim 2 wherein:

the rib has two downwardly projecting surfaces which extend from the base and intersect a surface connecting the two downwardly projecting surfaces which is below the lower surface.

6. A feed apparatus in accordance with claim 3 wherein:

the rib has two downwardly projecting surfaces which extend from the base and intersect a surface connecting the two downwardly projecting surfaces which is below the lower surface.

7. A feed apparatus in accordance with claim 4 wherein:

at least one of the downwardly projecting surfaces forms an obtuse angle with an intersection thereof with the lower surface and a width of the rib at the base thereof at the lower surface is greater than a width of the surface connecting the two downwardly projecting surfaces which is below the lower surface.

8. A feed apparatus in accordance with claim 5 wherein:

at least one of the downwardly projecting surfaces forms an obtuse angle with an intersection thereof with the lower surface and a width of the rib at the base thereof at the lower surface is greater than a width of the surface connecting the two downwardly projecting surfaces which is below the lower surface.

9. A feed apparatus in accordance with claim 6 wherein:

at least one of the downwardly projecting surfaces forms an obtuse angle with an intersection thereof with the lower surface and a width of the rib at the base thereof at the lower surface is greater than a width of the surface connecting the two downwardly projecting surfaces which is below the lower surface.

10. A feed apparatus in accordance with claim 1 wherein:

teeth of the toothed driving wheel have a pressure receiving surface which at least partially contacts an outer surface of a hinge eye.

11. A feed apparatus in accordance with claim 2 wherein:

teeth of the toothed driving wheel have a pressure receiving surface which at least partially contacts an outer surface of a hinge eye.

12. A feed apparatus in accordance with claim 3 wherein:

teeth of the toothed driving wheel have a pressure receiving surface which at least partially contacts an outer surface of a hinge eye.

13. A feed apparatus in accordance with claim 4 wherein:

teeth of the toothed driving wheel have a pressure receiving surface which at least partially contacts an outer surface of a hinge eye.

14. A feed apparatus in accordance with claim 5 wherein:

teeth of the toothed driving wheel have a pressure receiving surface which at least partially contacts an outer surface of a hinge eye.

15. A feed apparatus in accordance with claim 6 wherein:

teeth of the toothed driving wheel have a pressure receiving surface which at least partially contacts an outer surface of a hinge eye.

16. A feed apparatus in accordance with claim 7 wherein:

teeth of the toothed driving wheel have a pressure receiving surface which at least partially contacts an outer surface of a hinge eye.

17. A feed apparatus in accordance with claim 8 wherein:

teeth of the toothed driving wheel have a pressure receiving surface which at least partially contacts an outer surface of a hinge eye.

18. A feed apparatus in accordance with claim 9 wherein:

teeth of the toothed driving wheel have a pressure receiving surface which at least partially contacts an outer surface of a hinge eye.

19. A feed apparatus according to claim 10, wherein:

a demarcation surface of the teeth intersects the pressure receiving surface and forms an acute angle with the pressure receiving surface.

20. A feed apparatus according to claim 19, wherein:

the lowermost surface of the modules runs longitudinally and one of the slanting portions substantially has an inclination the same as the demarcation surface.

21. A feed apparatus according to claim 19, wherein:

the lowermost surface of the modules runs longitudinally and one of the slanting portions substantially has an inclination the same as the demarcation surface.

22. A feed apparatus according to claim 10, wherein:

an intersection of the pressure receiving surface and the demarcation surface is situated between two hinge eyes of the same module.

23. A feed apparatus according to claim 10, wherein:

the pressure receiving surface forms an angle with a radius of the toothed driving wheel ranging between 0–10°.

24. A feed apparatus according to claim 10, wherein:

the pressure receiving surface has a radius of curvature which is approximately identical with a radius of curvature of the hinge eyes.

25. A feed apparatus according to claim 10, wherein:

surfaces between individual teeth are slanted and run linearly and a greatest distance to a center of revolution of the wheel is at the pressure receiving surface.

26. A feed apparatus according to claim 10, wherein:

a second surface of the teeth opposite the pressure receiving surface converges towards a top of the teeth.

27. A feed apparatus according to claim 10, wherein:

a width of the tooth is between 80–98% of a distance between immediately adjacent hinge eyes.

28. A method of use of a feed apparatus comprising a conveyor belt, the conveyor belt comprising modules with an upper and a lower surface, the modules comprising hinge eyes pivotally hinged to each other, a rib including a base intersecting the lower surface at two locations, the rib projecting longitudinally along each module and away from the lower surface of each module, and a driving wheel which drives the conveyor belt; and wherein the lower surface has slanting portion extending respectively away from each location comprising:

draining liquid along the slanting portions away from each location toward the hinge eyes while operating the conveyor belt.

* * * * *

UNITED STATES PATENT AND TRADEMARK OFFICE
CERTIFICATE OF CORRECTION

PATENT NO. : 6,412,625 B2
DATED : July 2, 2002
INVENTOR(S) : Damkjaer

It is certified that error appears in the above-identified patent and that said Letters Patent is hereby corrected as shown below:

<u>Title page,</u>
Item [63], should read

-- [63] Continuation of Application No. 09/567,760, filed on May 9, 2000, claiming priority of Danish Patent Application PA 1999 01039, filed July 19, 1999 --

Signed and Sealed this

Twelfth Day of November, 2002

*Attest:*

*Attesting Officer*

JAMES E. ROGAN
*Director of the United States Patent and Trademark Office*